United States Patent Office 3,539,371
Patented Nov. 10, 1970

3,539,371
CERAMIC PIGMENTS PRODUCED WITH THE AID OF PEROXY COMPOUNDS
Horst Weber, Leverkusen, Germany, assignor to Farbenfabriken Bayer Aktiengesellschaft, Leverkusen, Germany, a corporation of Germany
No Drawing. Filed Apr. 11, 1968, Ser. No. 720,495
Claims priority, application Germany, Apr. 14, 1967, F 52,124
Int. Cl. C09c 1/00
U.S. Cl. 106—299                            6 Claims

ABSTRACT OF THE DISCLOSURE

Production of ceramic pigments of a zirconium/silicon/praseodymium oxide or zirconium/silicon/vanadium oxide system having improved tinting strength and true retentive color, produced by calcining, e.g. at about 850–1300° C., an aqueous mixture which is obtained by mixing an alkali metal zirconium silicate containing 1–4 mols of alkali per mol of zirconium silicate with a praseodymium or vanadium compound as pigment member, e.g. praseodymium or vanadium oxide or heat-decomposable salt thereof, water in a molar ratio of zirconium silicate: water of between 1:5–1:20 and a sulfate component, e.g. ammonium sulfate and/or free sulfuric acid in an amount of between 0.8 and 1.5 acid equivalents based on the alkali together with at least one peroxide compound preferably sodium peroxide or ammonium peroxydisulfate, admixed with said mixture in a quantity of substantially between about 0.1–10 parts by weight per part by weight of the praseodymium or vanadium correspondingly present in said mixture.

---

This invention relates to a process for the production of zirconium pigments containing praseodymium or vanadium, and is particularly concerned with a process for the preparation of yellow ceramic pigments, and blue ceramic pigments of the system zirconium/silicon/vanadium oxide or zirconium/silicon/praseodym oxide, by calcining sulfuric acid mixtures of alkali, zirconium oxide, silicon oxide and either praseodymium or vanadium oxide together with a peroxide additive.

Ceramic pigments of the zirconium/silicon/praseodymium oxide and zirconium/silicon/vanadium oxide systems (Pr-yellow and V-blue in short) are known and are used with advantage for colouring zirconium-containing enamel and glaze systems by virtue of their high resistance to firing and their purity of colour. They are usually prepared by calcining mixtures of ultra-pure zirconium oxide ($ZrO_2$), silicon oxide ($SiO_2$) and either praseodymium oxide ($Pr_6O_{11}$) or vanadium oxide ($V_2O_5$), optionally in the presence of sodium fluoride and sodium chloride as mineralizers. Additions of rare earths of the cerium group, tungsten oxide, alkaline earth metal compounds and lead compounds have also been described (cf. Japanese Pat. No. 5,329, U.S. Pats. Nos. 2,992,123 and 3,012,998, and German Pats. Nos. 1,222,840 and 1,222,841).

According to some of our own earlier proposals (see copending U.S. patent applications Ser. No. 608,484, filed Jan. 11, 1967, and Ser. No. 621,123, filed Mar. 7, 1967), we developed processes, which are more economical to work than conventional processes and which provide products of greater tinting strength in addition to a pure tone and a high thermal and chemical stability. In these processes, the naturally occurring zirconium silicate is converted into non-refractory form by heating with alkalis, the resulting product is mixed in specific ratios with water, a praseodymium or vanadium compound and an inorganic acid, preferably sulfuric acid, and the resulting mixture is calcined at a temperature of from about 850–1300° C.

It has now been found in accordance with the present invention that both the method by which they are prepared and the quality of the products can be improved even further by carrying out calcination at a temperature of between about 850–1300° C. using an aqueous mixture which is obtained by mixing an alkali metal zirconium silicate containing 1–4 mols of alkali per mol of zirconium silicate with water in a molar ratio of zirconium silicate:water of between about 1:5–1:20, a praseodymium or vanadium compound as pigment member, e.g. praseodymium or vanadium oxide or heat-decomposable salts thereof and an inorganic sulfate coponent, e.g. ammonium sulfate or free sulfuric acid in an amount of between 0.8 and 1.5 acid equivalents based on the alkali the improvement which comprises adding to said mixture at least on peroxide compound.

The quantity in which the peroxide compound or compounds are present must amount to between 0.1 and 10 parts by weight per part by weight of the praseodymium or vanadium present in the mixture. The pigment members i.e. the vanadium or praseodymium compound should be present in said mixture in an amount of between 0.1 and 10% by weight, calculated as the oxides and based on the zirconium silicate present.

It is possible by adding the peroxide compound to increase the tinting strength of the Pr-yellow obtained to about 1.5 to 4 times the original value in such a way that, firstly, the bright lemon yellow hue remains intact and, secondly, there are no undesirable changes in colour. It is also possible, however, by adding the peroxide compounds in accordance with the invention to reduce the praseodymium content of the mixture, in which case the pigments show the same tinting strength as the additive-free mixture, thus conserving valuable praseodymium.

The addition of peroxide compounds to V-blue also produces an increase in tinting strength. In this case, however, the increase obtained is some 10% to 50% weaker than that obtained in the case of Pr-yellow. However, another advantage is obtained insofar as the change in colour of the powder to a greenish-grey or brownish colour, which occurred so readily in conventional processes at low temperatures and with short calcination times, is appreciably suppressed or eliminated altogether.

In addition, it has been found as an advantage that the addition of a peroxide compound substantially reduces the tendency of the product being calcined to adhere to the walls of the crucible or furnace.

Suitable peroxide compounds include inter alia hydrogen peroxide, its aqueous solutions, its addition compounds, preferably sodium peroxide, other alkali metal peroxides, e.g., $K_2O_2$, $Li_2O_2$, etc., alkaline earth metal peroxides, e.g., $BaO_2$, $CaO_2$, $MgO_2$, etc., peroxysulfuric acid and its salts such as its alkali metal and ammonium salts, e.g., $NaHSO_5$, $Na_2SO_5$, $KHSO_5$, $K_2SO_5$, $(NH_4)HSO_5$, $(NH_4)_2SO_5$, etc., and peroxydisulfuric acid and its salts, such as its alkali metal and ammonium salts, e.g., $NaHS_2O_8$, $Na_2S_2O_8$, $KHS_2O_8$, $K_2S_2O_8$ $(NH_4)HS_2O_8$, $(NH_4)_2S_2O_8$, etc., and preferably ammonium peroxydisulfate.

In particular, the process of the invention may be carried out, for example, as follows:

A powdered compound with substantially the composition: (1–1.5) $Na_2O \cdot ZrO_2 \cdot SiO_2$ is produced by heating, e.g., at 800–1200° C., a mixture of a zirconium sand mineral ($ZrSiO_4$) and soda ($Na_2CO_3$). This compound, called sodium zirconium silicate, is mixed with a praseodymium or a vanadium compound, e.g., praseodymium-oxide, -oxalate, -chloride, -nitrate, -sulfate, -fluoride, -carbonate, etc., or vanadium pentoxide, ammonium vanadate, vanadium-oxychloride, -oxyfluoride, -trichloride, etc., or other oxide-forming praseodymium or vanadium compound, the described peroxide compounds and with water and sulfuric acid or, instead of sulfuric acid itself, its ammonium salt which gives off ammonia below the calcination temperature and then has the same effect as sulfuric acid. The resulting aqueous mixture is calcined at a temperature of from about 850–1300° C., and preferably at a temperature of from 950–1150° C., and is optionally ground, washed and dried in the usual way. Generally, the zirconium silicate starting compound contemplates alkali metal zirconium silicate of substantially the composition 1–1.5 (alkali metal)$_2$O.ZrO$_2$.SiO$_2$.

A few percent, e.g., 1–5%, of sodium chloride, sodium fluoride, an alkaline earth metal compound, a cerium compound, a lanthanum compound, a neodymium compound, a lead compound, a manganese compound, a molybdenum compound, or a tungsten compound may also be added to the mixture, although there is no significant advantage in doing this.

The process according to the invention is illustrated by the following examples:

EXAMPLE 1

183 g. (1 mol) of zirconium sand ZrSiO$_4$ are mixed with 120 g. (1.13 mol) of anhydrous soda Na$_2$CO$_3$, and the resulting mixture is heated for 1 hour at 1000° C. The non-refractory product thus obtained, sodium zirconium silicate, with substantially the composition: 1.13

$$Na_2O.ZrO_2.SiO_2$$

is mixed with 160 ml. of water and 4 g. (0.513 mol) of sodium peroxide (Na$_2$O$_2$). A solution prepared from 4 g. (0.00392 mol) of praseodymium oxide, 10 ml. of 96% sulfuric acid and 90 ml. of water is initially poured into this suspension with stirring, followed by the addition of 150 g. of 96% sulfuric acid. The suspension solidifies into a homogeneous mass. This mixture is calcined for about 2 hours at 1100° C. in a ceramic crucible, after which the resulting calcine is size-reduced in a ball mill in the presence of water, washed free of salt and then dried. When embedded in a quantity of 2 parts by weight in 100 parts by weight of an enamel or a ceramic glaze made opaque with zirconium, the product shows about 3 times the tinting strength of a product prepared in exactly the same way except for the addition of 4 g. of sodium peroxide.

EXAMPLE 2

183 g. of zirconium sand: ZrSiO$_4$ are mixed with 120 g. of anhydrous soda: Na$_2$CO$_3$ and the resulting mixture is tempered for 1 hour at 1000° C. The resulting non-refractory product, sodium zirconium silicate, with substantially the composition 1.13 Na$_2$O.ZrO$_2$.SiO$_2$, is mixed with 160 ml. of water and 4 g. (0.0175 mol) of ammonium peroxydisulfate: (NH$_4$)$_2$S$_2$O$_8$. A solution prepared from 4 g. (0.00392 mol) of praseodymium oxide Pr$_6$O$_{11}$, 10 ml. of 96% sulfuric acid and 90 ml. of water is initially poured into this suspension with stirring, followed by the addition of 150 g. of 96% sulfuric acid. The suspension solidifies to form a homogeneous mass. This mixture is calcined for two hours at about 1100° C. in a ceramic crucible. The calcine is size-reduced in a ball mill in the presence of water, washed free of salt and then dried. When embedded in a quantity of 2 parts by weight in 100 parts by weight of an enamel or a ceramic glaze made opaque by zirconium, the product shows about 3 times the tinting strength of a product made in exactly the same way except for the addition of 4 g. of ammonium peroxydisulfate.

EXAMPLE 3

92 kg. (500 mols) of zirconium sand: ZrSiO$_4$ were mixed with 60 kg. (566 mols) of anhydrous soda: Na$_2$CO$_3$ and the resulting mixture was heated for 1 hour at 1000° C. The resulting non-refractory product: sodium zirconium silicate, with substantially the composition 1.13

$$Na_2O \cdot ZrO_2 \cdot SiO_2,$$

is mixed with 2.5 kg. (21.4 mols) of ammonium metavanadate: NH$_4$VO$_3$, 1.0 kg. (4.39 mols) of ammonium peroxydisulfate (NH$_4$)$_2$S$_2$O$_8$ and 75 litres of water. 39 kg. of 96% sulfuric acid are poured into this suspension with stirring, causing the suspension to solidify into a homogeneous mass. This mixture is heated to 1000° C. in a continuously rotating calcination drum ceramically lined and directly heated by gas, and is kept at this temperature for 10 minutes. The calcine is then size-reduced in a ball mill in the presence of water, washed free of salt and dried. The product does not adhere to the walls of the drum, and does not show any change in colour to greenish-grey or brown. When embedded in a quantity of 2 parts by weight in 100 parts by weight of an enamel or a ceramic glaze made opaque with zirconium, it produces a much greater purity and brilliance of colour, and has a tinting strength some 35% higher than that of a product produced in exactly the same way without the addition of 1.0 kg. of ammonium peroxydisulfate, but in the presence or absence of sodium fluoride as a mineralizer.

What is claimed is:

1. Improved process for the production of the ceramic pigment of a system selected from the group consisting of zirconium/silicon/praseodymium oxide and zirconium/silicon/vanadium oxide systems, wherein at a temperature substantially between about 850–1300° C. an aqueous mixture is calcined which is obtained by mixing an alkali metal zirconium silicate containing 1–4 mols of alkali per mol of zirconium silicate with a pigment member selected from the group consisting of a praseodymium compound and a vanadium compound, water in a molar ratio of zirconium sulfate:water of between about 1:5–1:20 and a sulfate component selected from the group consisting of ammonium sulfate, sulfuric acid and mixtures thereof in an amount of between 0.8 and 1.5 acid equivalents based on the alkali, the improvement which comprises adding to said mixture a peroxide compound selected from the group consisting of hydrogen peroxide, hydrogen peroxide aqueous solutions, alkali metal peroxides, alkaline earth metal peroxides, peroxysulfuric acid, alkali metal and ammonium peroxysulfate, peroxydisulfuric acid, and alkali metal and ammonium peroxydisulfates, in a quantity of substantially between about 0.1–10 parts by weight per part by weight of the corresponding element selected from the group consisting of praseodymium and vanadium present in said pigment member.

2. Improved process according to claim 1 wherein said peroxide compound is ammonium peroxydisulfate.

3. Improved process according to claim 1 wherein said peroxide compound is sodium peroxide.

4. Improved process according to claim 1 wherein the alkali metal zirconium silicate is sodium zirconium silicate having substantially the composition (1–1.5)

$$Na_2O \cdot ZrO_2 \cdot SiO_2$$

5. Improved process according to claim 1 wherein said calcining is carried out in the additional presence of a mineralizer selected from the group consisting of sodium chloride and sodium fluoride.

6. Process for the production of a ceramic pigment of a system selected from the group consisting of zirconium/silicon/praseodymium oxide and zirconium/silicon/vanadium oxide systems, which comprises calcining at a temperature substantially between about 850–1300° C. an aqueous mixture of an alkali zirconium silicate compound having substantially the composition 1–1.5 (alkali metal)$_2$O·ZrO$_2$·SiO$_2$ with a pigment member selected from the group consisting of a praseodymium compound and vanadium compound, and an inorganic sulfate compound selected from the group consisting of ammonium sulfate and free sulfuric acid, in the presence of a peroxide compound selected from the group consisting of hydrogen peroxide, hydrogen peroxide aqueous solutions, alkali metal peroxides, alkaline earth metal peroxides, peroxysulfuric acid, alkali metal and ammonium peroxysulfates, peroxydisulfuric acid and alkali metal and ammonium peroxydisulfates, admixed therewith in a quantity of substantially between about 0.1–10 parts by weight of the corresponding element selected from the group consisting of praseodymium and vanadium present in said pigment member.

References Cited

UNITED STATES PATENTS

| | | | |
|---|---|---|---|
| 2,441,447 | 5/1948 | Seabright | 106—299 |
| 2,992,123 | 7/1961 | Seabright | 106—299 |
| 3,012,898 | 12/1961 | Seabright | 106—299 |
| 3,025,178 | 3/1962 | Seabright | 106—299 |
| 3,168,410 | 2/1965 | Bruneau | 106—299 |
| 3,300,414 | 1/1967 | Meyer-Simon et al. | 106—299 XR |
| 3,389,005 | 6/1968 | Kloepfer et al. | 106—299 |

TOBIAS E. LEVOW, Primary Examiner

H. M. S. SNEED, Assistant Examiner